May 23, 1972 P. EVERY 3,664,714
SKID CONTROL VALVE ASSEMBLY
Filed Dec. 8, 1969 3 Sheets-Sheet 1

INVENTOR.
Peter Every
BY
Harness, Dickey & Pierce
ATTORNEYS.

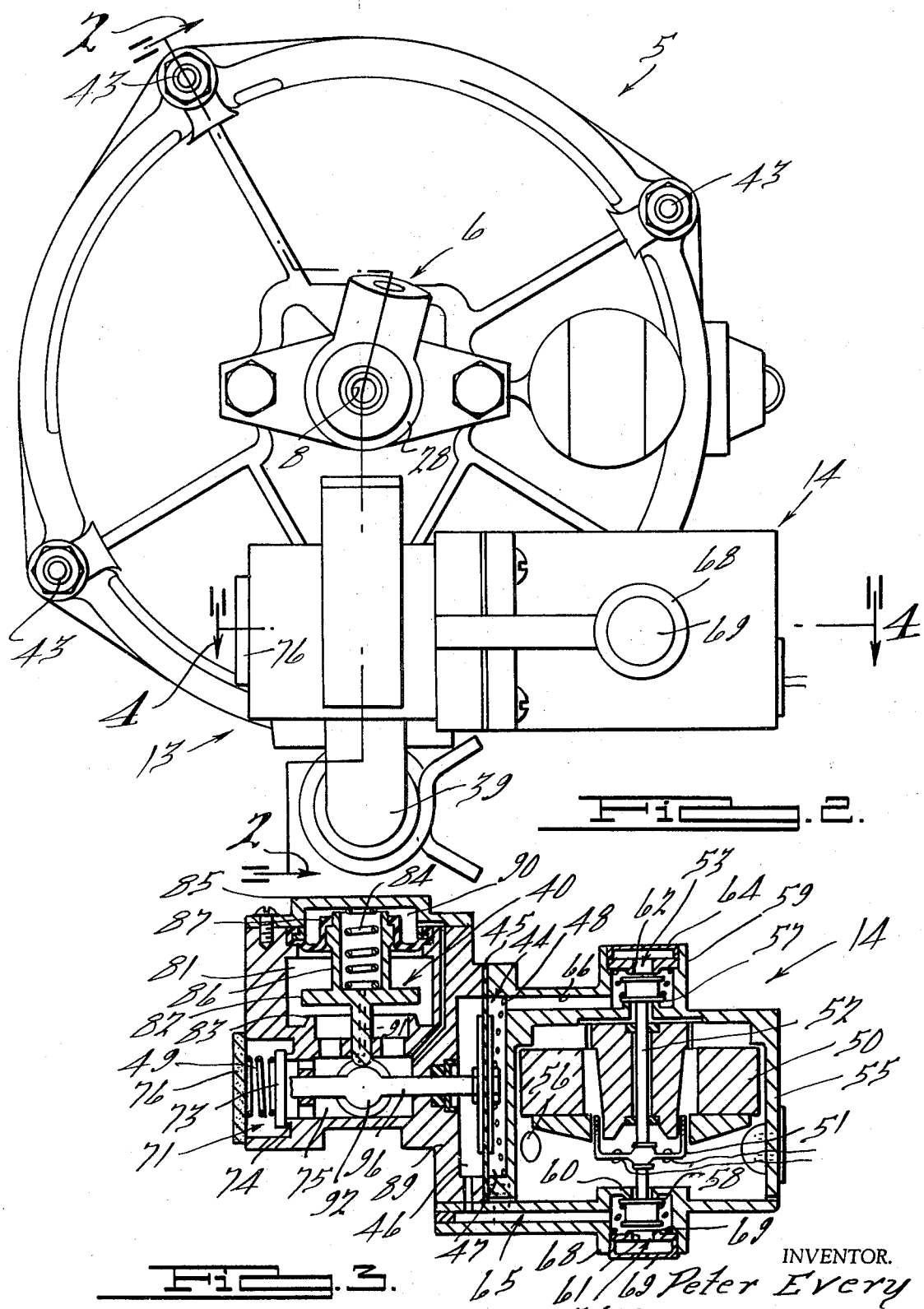

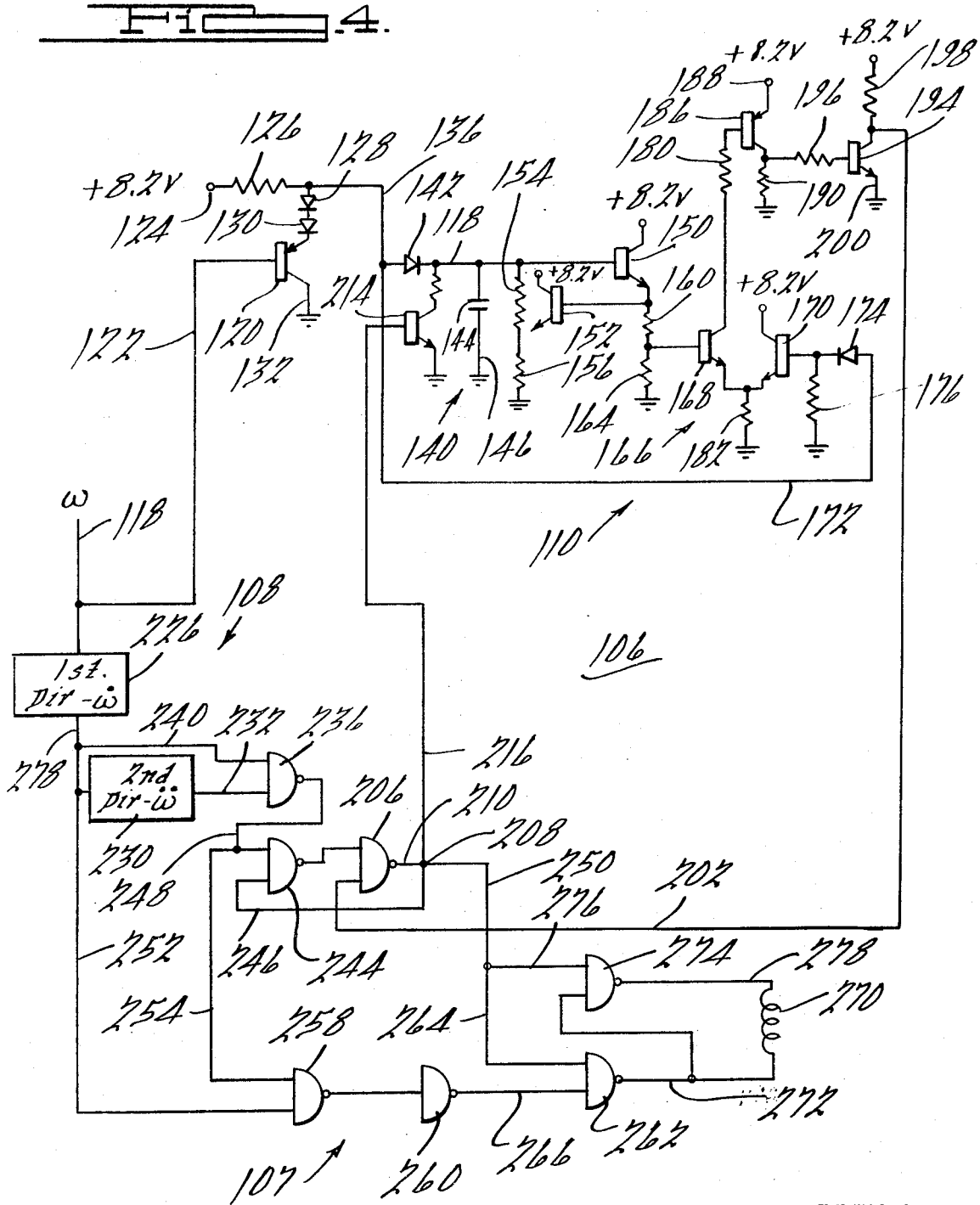

United States Patent Office 3,664,714
Patented May 23, 1972

---

3,664,714
SKID CONTROL VALVE ASSEMBLY
Peter Every, Livonia, Mich., assignor to Kelsey-Hayes Company, Romulus, Mich.
Filed Dec. 8, 1969, Ser. No. 883,166
Int. Cl. B60t 8/06
U.S. Cl. 303—21 F    23 Claims

ABSTRACT OF THE DISCLOSURE

A control system and force motor assembly for controlling the skidding of a vehicle under braked conditions when the control system provides a signal for controlling the position of an armature or fluid pressure controlling device in one of three conditions; the first condition being the "dump" mode of operation when the force motor is controlled to preclude braking pressure from being supplied to the wheels of the vehicle, the "hold" mode of operation when the braking force presented at the time the system goes into the "hold" mode of operation is maintained, and the "return" mode of operation when full applied braking pressure is returned to the vehicle wheels.

The control system is effectively responsive to a critical slip signal, the signal being generated in response to a sensed difference between a hypothetical vehicle deceleration, as approximated by a decreasing ramp signal, and the vehicle wheel speed. This comparison is made on a differential basis to provide an output signal which is utilized in controlling an output gate. The gate is also responsive to the sensing of a positive wheel acceleration signal and a change in sign of the rate of change of wheel acceleration. The signal from the output gate is fed to an output logic circuit, the output logic circuit also being rendered responsive to the first derivative of the wheel velocity signal and a combination of first and second derivative of the wheel velocity signal.

The output signals are utilized in the output logic circuit to generate one of three signal conditions across the voice coil of the force motor actuator assembly. In the return mode of operation, the polarity of the output signals generated across the voice coil are of the same polarity to cause zero current to flow through the voice coil. In the dump mode of operation, the coil is provided with current flow in a first direction and in the hold mode of operation the solenoid coil in a first direction and in the hold mode of operation the solenoid coil is supplied with current flowing in a second direction opposite to the first direction. The force motor is fabricated with a three positioned armature which is adapted to be placed either in the return or deactuated position, where no signals are provided from the control circuit; a dump mode of operation which disconnects the manually actuated brake cylinder hydraulically to the wheel cylinders to provide reduced braking pressure; and the hold position which maintains the pressure being fed to the wheels at the time the hold position is achieved.

---

The purpose of the foregoing abstract is to enable the Patent Office and the public generally, and especially scientists, engineers or practitioners in the art to determine quickly, from a cursory inspection, the nature and essence of the technical disclosure of the application. The abstract is neither intended to define the invention of the application, which is measured by the claims, nor is it intended to be limiting as to the scope of the invention in any way.

BACKGROUND AND SUMMARY OF THE DEVELOPMENT

This invention relates generally to vehicle braking systems and, more particularly, to a brake control valve assembly for preventing wheel skidding and minimizing stopping distances while maintaining directional stability, the valve assembly receiving control signals from a control system which senses, on the run-down portion of the cycle, a critical slip signal and, on a spinup side of the cycle, a positive wheel acceleration and a change in the sign of the rate of change of the wheel acceleration signal to produce one of three output signal conditions, i.e., a zero current signal condition, a first polarity or direction of current flow condition and a second polarity or flow of current direction signal, to control the valve assembly, and particularly the position of the armature of a force motor connected in pressure controlling relation with a wheeled vehicle braking system.

For purposes of describing the system of the present invention, the term "slip" refers to a characteristic of the rotating element whereby the element rotates at less than its free rolling speed when a braking force or torque is applied. In the context of the system, this slip may be approximated by a hydrothetical measure of the vehicle speed in comparing this vehicle speed to a wheel speed. The term "skid" or "slide" refers to a locked wheel condition.

One of the major difficulties which arises in a braking and moving vehicle, such as an automobile, an aircraft or other wheeled vehicle, occurs when the braking wheel, or wheels, skid or slide, this skid tending to create an unstable condition in the controlled motion of the vehicle. Wheel lockup may cause such a loss in directional stability as to result in an uncontrolled skidding or sliding while at the same time the presence of locked wheels generally increases the distance required to stop due to the reduced coefficient of friction while skidding.

Several skid control systems have been devised which are effective under various road conditions to minimize stopping distance while maximizing the directional stability of the vehicle. One such system as disclosed in copending application of Ronald S. Scharlack, Ser. No. 854,826, filing date Sept. 3, 1969, and executed on Aug. 28, 1969, now U.S. Pat. No. 3,614,906 discloses a critical slip sensing system and a logic circuit to detect when the system is in a critical slip or when a positive wheel acceleration signal exists in conjunction with a change in sign of the rate of change of wheel acceleration from a positive to a negative value.

This latter system is utilized, in conjunction with additional logic circuitry, to provide a three mode control signal which is utilized to control the force motor, and the armature associated therewith, in three modes of operation, i.e., the dump, hold and return modes of operation.

It has been discovered that a braking system may be used most efficiently if, upon sensing of the acceleration or spinup of the wheel, the brake pressure be held at the particular value achieved at the start of the spinup of the wheels rather than dropping the brake pressure down to a further point. Since the wheel is already starting the spinup portion of the cycle, it is not necessary to further dump brake pressure. It is the purpose of the present system to hold the brake pressure at the particular value at which spinup will occur and reapply brake pressure upon the sensing of the inflection point on the spinup side of the cycle. At this inflection point, brake pressure is again applied (the return mode of operation) to cause the wheel to decrease its rate of change of acceleration and finally achieve the run-down or deceleration portion of the cycle. Prior to the achieving of the critical slip point, the brake pressure is returned to the wheels at a preselected rate of return.

For purposes of this discussion, the portion of the cycle between the application of brake pressure initially and the sensing of the critical slip point will be referred to as the preskid portion of the cycle. The portion of the cycle between the critical slip point and the start of the spinup of the wheels will be called the skid portion of the cycle. The portion of the cycle between the start of spinup and the sensing of the inflection point at which the rate of change of acceleration curve changes sign will be called the acceleration mode of operation. The final portion of the cycle between the inflection point and the top of the spinup portion of the cycle will be called the post inflection portion, and the system achieves the preskid portion after the post inflection portion of the cycle.

Accordingly, it is one object of the present invention to provide an improved system for operating the brakes of a wheeled vehicle.

It is another object of the present invention to provide an improved skid control system for the brake or brakes of a wheeled vehicle.

It is still a further object of the present invention to provide an improved brake control system of the type described which is capable of eliminating skidding or sliding of the braked wheel including a provision for holding the brake pressure during a predetermined portion of the wheel velocity cycle.

It is still another object of the present invention to provide an improved triple mode skid control valve assembly which includes an improved skid sensing system.

It is still a further object of the present invention to provide an improved triple mode valve assembly which is controlled by a circuit for generating a critical slip signal.

It is still a further object of the present invention to provide an improved triple mode valve assembly which is capable of holding pressure to the wheels during the acceleration mode of operation.

It is still a further object of the present invention to provide an improved triple mode valve assembly which is capable of trapping the control pressure in a hold mode of operation.

It is still another object of the present invention to provide an improved skid control valve assembly incorporating three modes of operation i.e., a dump, hold and return mode of operation.

It is still another object of the present invention to provide an improved skid control valve assembly for use in connection with a skid control system which incorporates the first and second derivative of the wheel speed signal and also a critical slip signal to control the operation of a triple mode valve.

It is still a further object of the present invention to provide an improved skid control valve assembly which is reliable in use, inexpensive to manufacture and easily installed.

Further objects, features and advantages of this invention will become apparent from a consideration of the following description, the appended claims and the accompanying drawings in which:

FIG. 2 is an end view of the force motor and valve assemblies of FIG. 1;

FIG. 3 is a cross-sectional view of FIG. 2 taken along line 3—3 thereof; and

FIG. 4 is a schematic diagram illustrating the features of a skid control system adapted to be utilized with the valve assembly of the present invention.

Figure 1:
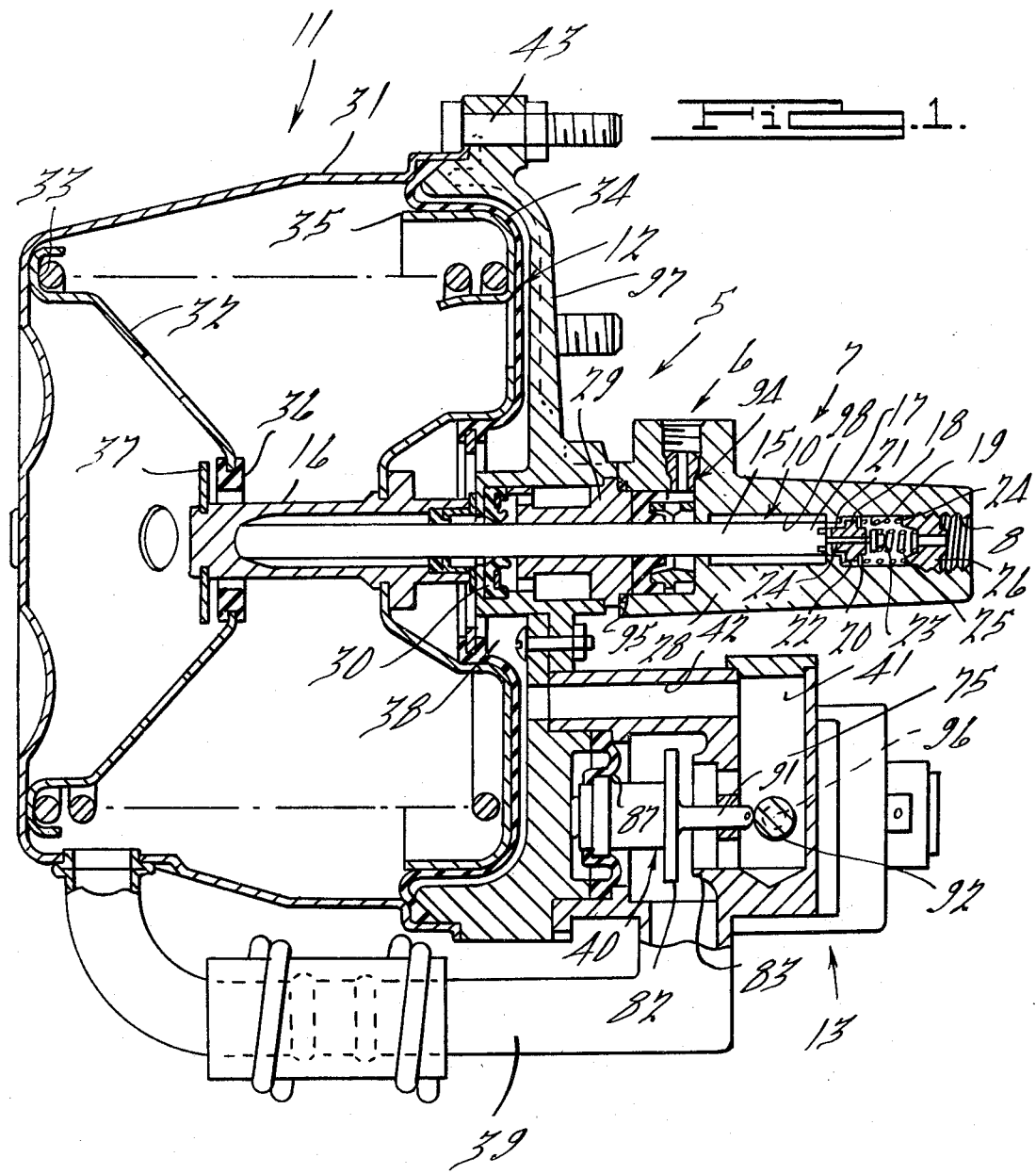
FIG. 1 is a cross-sectional view of a preferred form of triple mode force motor and control valve for use in connection with the circuit of FIG. 4 as taken along line 1—1 of FIG. 2.

The skid control valve assembly of the present invention is particularly adapted to be utilized and will be described specifically for use with an automotive vehicle. However, as we understand, the features of the invention may be utilized with other types of vehicles, including aircraft and other wheeled vehicles, which are adapted to provide braking through a wheel type of element. In the case of an automotive use, the system of the present invention may be utilized in connection with either the front wheels, the rear wheels or both the front and rear wheels. However, for simplicity, the system will be described for use in conjunction only with the rear wheels of an automotive vehicle.

Referring now to FIGS. 1 to 3 there is illustrated a valve control assembly 5 which is utilized to control the application of fluid brake pressure to the wheel cylinders connected to a fluid output assembly 6, the pressure at the outlet port 6 being controlled by means of a hydraulic cylinder assembly 7. The input to the hydraulic cylinder assembly 7 is provided by means of a hydraulic line (not shown) connected to an inlet port 8 and a hydraulic piston assembly 10. The position of the piston assembly 10 is controlled by a diaphragm assembly 11, which, at its initial or rest balanced position, is provided with vacuum on either side of a diaphragm assembly 12. The vacuum or atmospheric pressure on the right side of the diaphragm assembly 12 is controlled by means of a control module 13, the control module 13 being in turn controlled by a force motor assembly 14.

In general, in the dump mode of operation, atmospheric pressure is supplied to the right side of the diaphragm assembly 12 to force the plunged assembly 10 to the left thereby closing the fluid passageway between inlet port 8 and outlet port 6 and expanding the chamber occupied by the plunger, thus relieving the pressure being supplied to the wheel cylinders. This removes break pressure from the wheel cylinders to permit the wheels to spinup. On the other hand, when it is desired to go into the hold mode of operation, appropriate valves are closed to trap the pressure in the right side of the diaphragm assembly to hold the plunger assembly 10 at the position reached when the hold mode of operation was signaled. Finally, in the return mode of operation, current is cut off to the force motor assembly 14 and the system achieves the position shown in FIGS. 1–3 to force the plunger 10 to the right to open the valving between the inlet port 8 and the output port 6, while reducing the volume of the chamber to hydraulic fluid by displacing fluid with the volume of the plunger 10, thus returning brake pressure to the wheel cylinders.

Referring specifically to the details of the hydraulic cylinder assembly 10, the assembly includes a piston element 15, the position of which is controlled by the diaphragm assembly through movement of a sleeve 16 as will be hereinafter explained. When the cup shape housing 16 moves to the left, the piston 15 will also move to the left due to the hydraulic pressure being exerted at the inlet port 8. The right end 17 of the piston 15 supports a valving assembly which includes a main poppet valve 18 which is slidably supported within bore 19 by means of a washer element 20. The initial movement of the piston 15 to the left permits a shoulder element 21 on the pocket valve body 18 to engage a valve seat 22 to close off fluid flow around the valve body 18. Further movement of the piston element 15 permits a bleeder valve 23 to close over a port (not shown), the valve 23 being slidably supported by means of a stem 24 mounted within a bore of the main valve body 18. In addition to the hydraulic pressure, the valve elements 18 and 23 are biased to the left by means of spring elements 24, 25 which are seated at one end thereof against a plug element 26 supported within the bore 19.

In the position shown in FIG. 1, fluid flow will enter the port 8, flow through the bore of the plug element 26, through the valve assembly, including valve bodies 18, 23 through the bore 98 and through the outlet port 6 by means of an outlet port assembly 94. The piston 15 is supported in sliding relation to the main body 28 by means of a bearing element 29 which is fixedly supported within the housing of the diaphragm assembly 11. Suitable sealing washers 30, 95 are provided to seal the piston 15 in its sliding movement.

As was stated above, the initial movement of the piston 15 to the left moves the main valve body 18 to the left to seat the valve body against the valve seat 22. Upon further movement of the piston element 15, the second valve body 23 moves into engagement with the main valve body to completely shut off the hydraulic pressure to the wheel cylinders. This motion, and further motion expands the chamber which is occupied by fluid and the piston 15 to relieve the pressure at the wheel cylinders. Upon return o fthe piston 15 to the right, the opposite action occurs and the chamber is contracted.

Referring to the specific details of the diaphragm assembly, the assembly includes a main diaphragm housing 31, the interior of which is connected to a source of vacuum (not shown) which generally is supplied by the engine vacuum system. The interior of the housing 31 is provided with a bell-shaped support member 32 which is utilized to support one end of a spring 33, the other end of the spring being biased against the interior of a diaphragm element 34 by means of a second support element 35. The bell-shaped member 32 includes, at its apex, an annular resilient washer element 36 which provides a stop for one direction of movement of the housing 16. The end of the housing 16 includes a washer element 37 which is adapted to position itself against the annular washer 36 when the housing element is initially assembled. The interior of the housing is connected to a vacuum source as described above and the other side of the diaphragm element is in fluid communication with a control chamber 38, the control chamber also being provided with vacuum through a pipe 39 connected at one end to the interior of the housing 31 and at the other end to the control chamber through a valving arrangement to be described hereinafter. Sufficient to say at this time that the vacuum is communicated to the chamber 38 through a valve assembly 40, a chamber 41 and a conduit 42 formed in the housing for the valve assembly 40. Thus, in the normal situation, with the valve assembly 40 open, both sides of the diaphragm assembly are connected to vacuum to provide a rest position for the diaphragm.

The top of the housing 31 is closed by means of an end bell assembly 97 which is bolted to the housing 31 by means of a plurality of fastener assemblies 43. The end bell assembly 42 also supports the plunger and valve assembly 15. For other details of this valve and diaphragm assembly, specific reference is made to copending application of William Stelzer, Ser. No. 702,095, filed Jan. 31, 1968, the specification of which is incorporated herein by reference.

Referring specifically to FIG. 3, the force motor assembly 14 is utilized to control the position of a second diaphragm assembly 44. Specifically, the diaphragm assembly 44 includes a diaphragm 45 and a pair of chambers 46, 47 positioned on either side of the diaphragm 45. The diaphragm 45 is positioned in its central location by means of a spring element 58 in the chamber 47 and a second spring 49 which acts against a shaft 96.

In the return mode of operation, as will be hereinafter explained in conjunction with the description of FIG. 4, zero current is flowing through a voice coil mounted on an armature 51, the coil being utilized to move the cup shaped armature element 51 which is mounted in magnetic circuit with the permanent magnet 50. The armature 51 is rigidly mounted on a shaft element 52, the shaft element controlling the operation of a pair of valve assemblies 53, 54. Accordingly, in the return mode of operation, zero current flows through the coil and the armature 51 is in the position shown. In the dump mode of operation, current flows through the coil such that the armature 51 is moved downwardly and the valve 54 is actuated as will be more fully explained hereinafter. In the hold mode of operation, the coil is energized in the opposite polarity to move the armature element 51 upwardly to actuate the upper valve 53.

The interior chamber of the force motor assembly, defined by a housing 55, is supplied with vacuum from a vacuum port 56. The vacuum port 56 may be connected to any suitable source of vacuum, as for example, the vacuum source connected to the housing 18. In the normal standby or return mode of operation, the interior chamber defined by housing 55 is subject to vacuum. However, the poppet valves 54, 53 include a pair of valve elements 57, 58 which are adapted to seat against portions of the housing 59, 60 which form valve seats for the valve elements 57, 58. Thus, the vacuum from port 56 is confined to the interior chamber of the force motor in the return mode of operation.

During this return mode of operation, air is supplied to the chambers 46, 47 by means of apertures 61, 62 connected to the atmosphere through suitable filters 63, 64. The aperture 61 is connected to the chamber 46 by means of passageway 65 and the aperture 62 is connected to the chamber 47 by means of a passageway 66. Accordingly, the diaphragm 45 will be at its mid-point position as illustrated in FIG. 3.

In the dump mode of operation, the armature 51 is moved downwardly because of the polarized energization of the coil. The downward movement of armature 51 closes the aperture 61 because of the seating of valve element 58 on the valve seat 69. This shuts off the flow of air to the passage 65 and thus to the chamber 46. On the other hand, the downward movement of the armature 51 opens the valve formed by valve element 58 and the valve seat 60 to introduce vacuum to the passageway 65 and thus the chamber 46. In this way, the chamber 46 is evacuated and a pressure differential is created across the diaphragm 45. It will be remembered that air is being supplied to the chamber 47. This causes the shaft 96 to move to the left. In the hold mode of operation, the opposite condition occurs wherein the shaft 52 is moved upwardly to close the air supply through passageway 62. Simultaneously, the vacuum source in the inner chamber of the force motor evacuates the chamber 47 by means of passageway 66 and the valve element 57. This causes the diaphragm element 45 to move to the right to cause shaft 96 to move to the right.

The shaft 96 is utilized to control two valves 71, 72. The valve 71 is directly connected to one end of the shaft 96 and includes a valving element 73 which is adapted to seat on a valve seat 74. The valve 71 controls the introduction of air into a chamber 75, the air being supplied from an exterior source, such as atmosphere, by means of a filter element 76. The valve assembly 72 is utilized to control the communication between chamber 75 and a second chamber 81 through a valve element 82 and a valve seat 83. The valve element 82 is biased downwardly and toward the valve seat 83 by means of a spring 84 which rests against an upper housing cap 85 and is nested within an annular housing portion 86 of the valve element 82. A diaphragm 87 is provided at the upper end of the valve element 82 and fluid passageway 88 is provided in a housing element 89 to communicate passage 75 with the upper passage 90 to balance the pressure across the valve element 82. The valve element also includes a stem 91 which is adapted to engage and be controlled by a raised portion 92 of shaft 96. The stem 91 is illustrated with a dotted flow passage which may be utilized in lieu of passage 88.

When the shaft 96 is moved to the left, the stem 91 will move to the right of the raised portion 92 and close the valve element 82 against the seat 83. On the other hand, when the shaft 96 moves to the right, a similar action will occur and the valve stem 91 will move to the left of the raised portion 92. Thus, when the shaft 96 is moved to the right, the valve assembly 40 and the valve assembly 71 will both be closed. On the other hand, when the shaft 96 moves to the left, the valve assembly 71 will be open and the valve 40 will be closed. When the shaft 96 is in the position shown, the valve assembly 71 will be closed and the valve assembly 40 will be open.

Accordingly, in the return mode of operation, vacuum is supplied from the vacuum source through the pipe 39 through the open valve assembly 40, the passage 41, the conduit 42 to the chamber 38. In this situation, the air source is shut off by means of a valve assembly 71. When the system goes into the dump mode of operation, the shaft 96 moves to the left to open the air source through the valve 71. This introduces air into the chamber 75, which air is fed to the chamber 38 through the passage 42. In this condition, the valve 40 is closed to shut off the communication with the vacuum source at conduit 39.

In the hold mode of operation, the shaft 96 moves to the right to close valve assembly 40 and also closes the valve assembly 71. This traps the pressure in the control chamber 38 that was present at the time the hold mode of operation was started.

Referring particularly to FIG. 4, there is schematically illustrated a control system 106 which includes an output circuit 107 to generate a signal across an output coil, the coil forming part of a solenoid assembly for the force motor described in conjunction with FIGS. 1 to 3. As stated above, the signal across the coil takes one of three forms, either current flowing through the coil in a first direction, current flowing through the coil in a second direction opposite to the first direction or zero current. This output signal is generated in accordance with the particular portion of the wheel velocity signal being sensed during the braking cycle of the wheel. This wheel velocity is sensed by means of an angular velocity transducer and a logic circuit 108, the latter of which is responsive to both the first and second derivative of the wheel angular velocity and also to a critical wheel slip signal which is generated by means of a critical slip circuit 110.

Referring particularly to the critical slip circuit 110, the circuit is utilized to control the release of the brakes on the rundown portion of the stopping cycle, and the wheel acceleration and rate of change of wheel acceleration signal generating circuit 108 is utilized in reapplying the brakes. Particularly, the circuit 110 includes an input from the wheel velocity sensing transducer (not shown) which provides a velocity input signal omega ($\omega$) to an input conductor 118. This signal is fed to an input amplifier transistor 120, and particularly to the base electrode thereof, by means of a conductor 122. The emitter-collector circuit of the transistor 120 is connected to a positive source of D.C. potential at terminal 124 through a resistor 126 and a pair of diodes 128 and 130 and the collector electrode is grounded at 132.

The transistor 120 is biased such that the entire wheel velocity signal, as illustrated in FIG. 2 of the aforementioned copending application Ser. No. 854,876, is transmitted through the output conductor 136 connected to the junction between the upper diode 128 and the resistor 126. The diagram of the aforementioned copending application illustrates a portion, and particularly one cycle, of the wheel velocity signal as impressed on conductor 136. The wave form is seen to be a damped oscillatory wave which is generally schematical about a decreasing straight line having a negative slope. The wheel velocity wave form impressed on conductor 136 is fed to a vehicle ramp speed generating circuit 140. The circuit 140 generates a ramp voltage which nearly approximates the actual vehicle speed. This ramp voltage may be selected to be of any configuration desired and, in a particular illustrated embodiment, the ramp is chosen to be one unit of gravity deceleration rate of the vehicle.

Particularly, the signal on conductor 136 is fed through a diode 142 to a capacitor 144, the opposite plate of the capacitor being grounded at 146. Thus, as long as the voltage on conductor 136 exceeds the voltage on conductor 144, the current will be fed to the capacitor 144. In this way, the capacitor is initially charged to a voltage which is representative of the unbraked wheel speed.

For purposes of this discussion, wheel velocity will be considered to be a damped oscillatory wave which oscillates about a relatively straight line having a negative slope as described above. Further, the portions of a single cycle of the wheel velocity wave will be referred to as described above, i.e., the preskid portion, the skid portion, the acceleration portion, and the post inflection portion. These portions of the cycle have been described in the preamble of this specification.

Accordingly, it is seen that the vehicle speed curve initially starts at a flat constant value which, after the wheel is braked, commences deceleration during the preskid portion of the cycle. Accordingly, the capacitor 44 is charged to a voltage which is a function of the wheel velocity during this relatively flat portion of the preskid portion of the cycle. Upon deceleration of the wheel toward the critical slip point, the wheel velocity signal is less than the charge on capacitor 144 due to the slow discharge circuit of capacitor 144 to be described hereinafter. Accordingly, the discharge circuit of capacitor 144 will cause the voltage on the capacitor to follow a hypothetical straight line which hypothetically approximates the car velocity, in this case a one gravity deceleration. However, the wheel velocity is rapidly decreasing due to the brake force applied to the wheel.

This capacitor discharge circuit is seen to include a transistor 150 and a transistor 152. Also, a voltage divider circuit including a resistor 154 and a resistor 156 are included in the discharge circuit. Particularly, the current flows through the base-emitter circuit of transistor 150, the base-emitter circuit of transistor 152 and then to ground through the resistor 156, the base-emitter drops create a constant voltage across resistor 154. Accordingly, a voltage is fed to a voltage divider circuit, including resistors 160, 164, the resistors 160, 164 being chosen to provide a preselected percentage of the vehicle velocity signal to one input circuit of a differential amplifier system 166. It is to be noted that the velocity signal being fed to the one point circuit of the differential amplifier 166 is directed through two diode drops, including diode 142 and the base-emitter circuit of transistor 150. This signal is fed to the base circuit of transistor 168 of the differential amplifier 166. The use of a percentage vehicle velocity signal is optional and other systems may be utilized.

On the other hand, the wheel velocity signal is also fed to the other input terminal of the differential amplifier circuit 166, and particularly to the base circuit of a transistor 170 through a conductor 172 and diode 174. This voltage is developed across a resistor 176 which is connected between the base electrode of transistor 170 and ground. In this case, it is noted that the wheel velocity signal is directed through a single diode drop, particularly diode 174.

The differential amplifier circuit 166 is of the conventional type and includes an output circuit, in this case a current limiting resistor 180, and the two emitter electrodes of transistor 166 and 170 are connected to ground through resistor 182. When the vehicle velocity signal fed to transistor 168 is sufficiently above the wheel velocity signal (in this case determined by the voltage divider resistor 160, 164 and the two diodes drop across the diodes 142 and the transistor 150 in the case of the vehicle velocity signal, and the voltage drop of the diode 174 in the case of the wheel velocity signal), the transistor 168 will be non-conductive and the transistor 170 will be conductive. However, when the wheel velocity signal drops by a preselected amount below the decreasing ramp voltage, the transistor 168 will be rendered conductive and the transistor 170 will be rendered non-conductive. This differential operation creates a critical slip signal which is a function of the wheel velocity and the vehicle velocity ramp signals.

When this critical slip is reached, the output signal from the transistor 168 is fed to an inverter amplifier transistor 186, the emitter of which is connected to a positive 8.2 volt potential at terminal 188 and the collector of which is connected to ground through a resistor 190. This critical signal causes transistor 186 to conduct to provide an output signal to a second inverter transistor 194 through a resistor 196. The second transistor 194 is connected to a positive potential through a resistor 198 and ground potential at 200. The conduction of resistor 186 causes normally non-conductive transistor 194 to conduct, thereby grounding the output conductor 202 connected to the collector electrode of transistor 194.

The signal on conductor 202 is fed to the circuit 108 and particularly to an "and" gate which has the characteristics that two positive signals to the input thereof will create a logical zero output signal and all other signal conditions will create a positive or logical one output signal, as for example, in the case of a zero input or both inputs being zero. This output signal from gate 206 is fed to an output node 208 connected to the input circuit of the control system 107 to be described hereinafter. The control circuit 107 is utilized to control the output duty cycle being fed to a triple mode force motor and valve assembly to be described in conjunction with FIGS. 2 to 4.

In the particular embodiment illustrated, the output signal is fed back to a disabling transistor 214 through a conductor 216. This positive signal will cause the normally non-conductive transistor 214 to conduct, thereby grounding conductor 218 through the collector-emitter circuit of transistor 214 and the resistor 220. This will rapidly discharge the capacitor 144 to disable the slip circuit. As will be seen from a further description of this system, the logic circuit, including gate 206, is designed to latch the output on until such time as certain conditions are sensed in the acceleration and rate of change of acceleration circuit 108. Thus, the disabling of the slip circuit will not effect the output signal being fed to the solenoid. It is to be understood that the disabling circuit, including conductor 216, transistor 214 and the resistor 220, may be eliminated in certain configurations of skid control systems. Further, the critical slip circuit 110 described above is presented purely for illustrative purposes and it is to be understood that other similar types of critical slip circuits may be utilized to generate the signal being fed to the gate 206.

Referring now to the circuit 108, the wheel velocity signal omega ($\omega$) impressed on conductor 118 is fed to a first differential circuit 226 which provides the differential of the wheel velocity signal on output conductor 228. It is to be understood that the differential circuit will be designed to provide the proper polarity of signals. The output from differentiator 226 is also fed to a second differential circuit 230 to provide a rate of change of wheel acceleration signal on the output conductor 232. This latter signal is fed to an output "and" gate 236 which is utilized to correlate the first and second derivatives of the wheel velocity signal, the first derivative signal being fed to the gate 236 by means of a conductor 240.

As stated above, the critical slip circuit 110 provides a logical zero input signal to the gate 206 to provide a logical one output signal from the gate 206 on conductor 210. This output signal is also fed to the input circuit of a third gate 244 by means of a conductor 246. Thus, gate 244 is responsive to the signals on conductor 246 and a conductor 248. The input signal to gate 236 from the differential circuit as impressed on conductor 240 is positive when the rate of change of wheel acceleration signal is less than zero. On the other hand, the signal on conductor 240 is at a logical one level when the omega dot ($\dot{\omega}$) signal is greater than zero.

It is to be noted that the omega dot, or wheel acceleration signal, is negative or less than zero for the entire first half of the wave. On the other hand, the rate of change of acceleration signal or omega double dot ($\ddot{\omega}$) is negative during the first 90° of the wave form and is positive during the second 90° of the wave form. Accordingly, the signal on conductor 240 will be at a logical zero during the whole first half of the cycle and the signal on the conductor 232 will be at a logical zero and switch to a logical one.

The first derivative signal supplied by differentiator circuit 226 is normally zero and switches to a positive signal when the wheels accelerate. The signal on conductor 232 is normally at a logical zero and then switches to a positive level with a negative second derivative of the wheel velocity signal. Accordingly, during the preskid portion of the cycle, the first derivative signal on conductor 240 is a negative, the critical slip signal on conductor 202 is a positive level signal and the output from conductor 236 is a logical zero. During the skid portion of the cycle, the first derivative is a logical zero and the critical slip signal on conductor 202 is a logical zero. This renders the output on conductor 248 a logical one level and the output from gate 206 on conductor 210 at a logical one level. During the acceleration portion of the cycle, the first derivative is a logical one level signal and the second derivative is a logical zero level signal. This maintains the output of gate 236, on conductor 248, at a logical one level and the output from gate 206 at a logical one level. During the post inflection portion of the cycle, the first and second derivatives are a logical one level and the output of gate 236 on conductor 248 switches to a logical zero level, which renders the output from gate 206 at a logical zero level.

The output from the circuit 108 is fed to the output circuit 107 by means of conductors 250, 252 and 254. The signal level on conductor 250 is at a logical zero level during the preskid portion of the cycle, is at a logical one level during the skid and acceleration portions of the cycle and is at a logical zero level at the post inflection portion of the cycle. On the other hand, the signal on conductor 252 is at a logical zero level during the preskid and skid portions of the cycle, and thus until the start of the run-up of the wheels. The voltage then switches to a logical one level from the start of the run-up portion of the cycle to the top of the run-up portion. On the other hand, the signal on conductor 254 is at a logical one level during the preskid and acceleration portions of the cycle and switches to a logical zero level during the post inflection portion of the cycle.

Particularly, the signals on conductors 252, 254 are fed to the input circuit of an "and" gate 258, the output of which is inverted by means of an inverter circuit 260. The signal form on conductor 250 is fed to the input circuit of a second "and" gate 262 by means of a conductor 264 and the "and" gate 262 is also provided with the output of inverter circuit 260 by means of a conductor 266. The output of gate 262 is fed to one end of the solenoid coil 270 by means of a conductor 272, the signal on conductor 272 also being fed to the input circuit of a third "and" gate 274. The gate 274 further includes an output from the gate 206, through conductor 250 and a conductor 276. The output of gate 274 is fed to the upper terminal of the coil 270 by means of a conductor 278.

In operation, and during the preskid mode portion of the cycle, the first derivative signal supplied to conductor 240 is at a logical zero level and the signal level on conductor 232 is at a logical one level due to the polarity characteristics selected for the derivative circuit 230. The slip signal on conductor 202 is at a logical one level during this portion of the cycle. Thus, the output from gate 236 is at a logical one level which renders the output on conductor 210 at a logical zero level. This is seen from the fact that, assuming the output at node 208 to be at a logical zero level, the input to gate 244 on conductor 246 is at a logical zero level. During this initial preskid portion of the cycle, the signal level on conductor 248 is at a logical one level to render the output from gate 244 at a logical one level due to the fact that the output signal from gate 206 on conductor 246 is at a logical zero level. This logical one is fed to gate 206 to be correlated with the slip signal which, during the initial preskid portion of the cycle is at a logical one level, to render the output at a logical zero level, the initial assumption.

Referring to gate 258, the signal level on conductor 248 during the preskid portion is at a logical one level and the first derivative signal on conductor 252 is at a logical zero level. Accordingly, the output from gate 258 will be at a logical one level which is inverted by the circuit 260 to provide a logical zero level at output conductor 266. During this initial portion, the signal on conductor 264 is at a logical zero level which is combined with the signal level on conductor 266 to provide a logical zero level to provide a logical one level at the output of conductor 272. This logical one level is fed to the input circuit of gate 274 to be correlated with the signal level on conductor 276. Both of these signals are at a logical zero level to produce a logical one level on output conductor 278. Thus, the signal at both the upper and lower end of the output coil 270 are at a logical one level to produce zero current flow through the coil 270. This defines the return mode of operation.

In the skid portion of the cycle, or the dump mode of operation, the first derivative on conductor 240 is at a logical zero level and the second derivative on conductor 232 is at a logical zero level. Accordingly, the output from gate 236 is at a logical one level and, assuming the output from gate 206 to be a logical one level the output from gate 244 will be at a logical zero level. This logical zero is fed to the input circuit of gate 206 to prove the logical one level assumed above.

The logical zero first derivative signal is fed to the input circuit of gate 258 along with the logical one level from the gate 236. These signal conditions produce a logical zero level signal at the input circuit to gate 262. This logical zero level is correlated with the logical one level on conductor 250 to produce a logical one level at the lower output terminal of the solenoid 270 connected to the conductor 272. This logical one level signal is also fed to the input circuit of gate 274 which is matched with the logical one level signal from the conductor 250 to produce a logical zero level signal at the upper output solenoid 270. This produces a current flow down through the coil 270 in the dump mode of operation.

During the acceleration portion of the cycle or the hold mode, the first derivative is a logical one and a second derivative is a logical zero. The signal conditions produce a logical zero level at the upper input to gate 206 to produce a logical one level signal on conductor 250. The logical one output signal from gate 236 and the first derivative signal, also a logical one level signal, produces a logical one input signal to the gate 26. This is correlated with the logical one signal on conductor 250 to produce a logical zero level signal at the lower end of the solenoid 270. This logical zero level is also fed to the input circuit of gate 274 which produces a logical one level signal at the upper part of the solenoid 270. Thus, during the hold mode of operation, current flows in the opposite direction or up through the coil 270.

During the return mode of operation or the post inflection portion of the cycle, the logical zero level at the input to gate 244 produces a logical one level which is correlated with the logical one level critical slip signal to produce the logical zero level signal at output 250.

Also, the first derivative signal is fed to the input circuit to gate 258 which is correlated with the logical zero level at conductor 254. This produces a logical zero level signal at the input to gate 262 which is correlated with a logical zero level signal conductor 264 to produce a logical one level signal at the lower terminal to solenoid coil 270. This logical one level signal is also fed to the gate 274 with the logical zero level signal on conductor 276 to produce a logical one at the upper output terminal to solenoid 270. Thus, there is no current flow through the coil 270 during the return mode of operation.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a skid control assembly for controlling the fluid pressure generated force applied to the brakes of at least one wheel of a wheeled vehicle by a fluid force generating means from a source of brake actuating fluid pressure, the improvement comprising a modulating valve assembly means actuable among three modes of operation, a return mode wherein the brake actuating fluid source is substantially communicated with the brakes, a hold position wherein a portion of pressure from the source is communicated with the brakes for a controlled period and a dump position where the pressure generated force from the source is relieved from the brake, said modulating valve assembly means including a valve, a valve chamber and piston means disposed in fluid communication with said fluid source and said brake fluid pressure generating means, said piston means being operatively associated with said valve chamber, piston actuating means connected to said piston means for controlling the operation of said valve, said piston actuating means including a diaphragm motor having a diaphragm and one of a source of pressure and a source of vacuum associated with one side of the diaphragm, and another source of vacuum and pressure, the movement of the diaphragm being controlled by the application of a differential pressure across said diaphragm, said modulating valve assembly means including a control chamber in fluid communication with the other side of said diaphragm and a control valve assembly including said another source of vacuum and source of pressure operatively associated with said control chamber for controlling the position of said diaphragm.

2. The improvement of claim 1 wherein said diaphragm motor moves said valve to a first, second and third position in said return, hold, and dump modes respectively.

3. The improvement of claim 1 further including a force motor assembly, the force motor assembly being connected to said valve assembly to control the operation of said valve assembly and the pressure applied to the other side of said diaphragm.

4. The improvement of claim 3 wherein said one side of said diaphragm assembly is supplied with one of the vacuum and pressure and the other side is, in the return mode, supplied with said one of said vacuum and pressure.

5. The improvement of claim 4 wherein said other side of said diaphragm is supplied with said another vacuum and pressure to move said piston means to said dump mode.

6. The improvement of claim 5 wherein said valve assembly includes means for trapping the pressure in said control chamber to hold the pressure in said control chamber and move the piston to said hold mode.

7. The improvement of claim 1 wherein said control valve assembly includes a first and second control valve, and force motor means connected to said first and second valves and operative to control said valves and control the application of said differential pressure across said diaphragm.

8. The improvement of claim 7 wherein said first valve is associated with said another source of vacuum and said second valve is associated with said another source of pressure.

9. The improvement of claim 8 wherein one of said first and second valves is closed and the other of said first and second valves is open to apply a zero differential pressure across said diaphragm in the return mode.

10. The improvement of claim 8 wherein both said first and second valves are closed to trap a preselected differential pressure across said diaphragm in the hold mode.

11. The improvement of claim 10 wherein said preselected differential pressure is the pressure in said control chamber at the time said first and second valves are closed.

12. The improvement of claim 8 wherein one of the said first and second valves is open and the other of said first and second valves is closed to apply a positive differential pressure across said diaphragm in the dump mode.

13. The improvement of claim 12 wherein one of said first and second valves is closed and the other of said first and second valves is open to apply a zero differential pressure across said diaphragm.

14. The improvement of claim 13 wherein both said first and second valves are closed to trap a preselected differential pressure across said diaphragm in the hold mode.

15. In a skid control assembly for controlling the fluid pressure generated force applied to the brakes of at least one wheel of a wheeled vehicle by a fluid force generating means from a source of brake actuating fluid pressure, the improvement comprising a modulating valve assembly means actuable among three modes of operation, a return mode wherein the brake actuating fluid source is substantially communicated with the brakes, a hold position wherein a portion of pressure from the source is communicated with the brakes for a controlled period and a dump position where the pressure generated force from the source is relieved from the brake, said modulating valve assembly means including a valve, a valve chamber and piston means disposed in fluid communication with said fluid source and said brake fluid pressure generating means, said piston means being operatively associated with said valve chamber, piston actuating means connected to said piston means for controlling the operation of said valve, said piston actuating means including a diaphragm motor having a diaphragm and one of a source of pressure and a source of vacuum associated with one side of the diaphragm, and another source of vacuum and pressure, the movement of the diaphragm being controlled by the application of a differential pressure across said diaphragm, said modulating valve assembly means including a control chamber in fluid communication with the other side of said diaphragm and a control valve assembly including said another source of vacuum and source of pressure operatively associated with said control chamber for controlling the position of said diaphragm, said control valve assembly including a first and second control valve, and force motor means connected to said first and second valves and operative to control said valves and control the application of said differential pressure across said diaphragm, said first valve being associated with said another source of vacuum and said second valve being associated with said another source of pressure, including means for selectively actuating said first and second valves, said selectively actuating means including a shaft, said first valve having a portion thereof engaging a first portion of said shaft and said second valve having a portion thereof engaging a second portion of said shaft, said first portion further including a raised portion and two detent portions and said second portion includes one end of said shaft.

16. The improvement of claim 15 wherein said second valve is in engagement with one of said detent portions to close said second valve and said end is in engagement with said another first valve to open said valve in said dump mode.

17. The improvement of claim 15 wherein said second valve portion is in engagement with another of said detent portions to close said second valve and said end of said shaft is out of engagement with said second valve to close said first valve in said hold mode.

18. The improvement of claim 15 wherein said second valve portion is in engagement with said raised portion to open said second valve and said end is out of engagement with said first valve to close said first valve in said return mode.

19. The improvement of claim 18 wherein said second valve is in engagement with one of said detent portions to close said second valve and said end is in engagement with said first valve to open said valve in said dump mode.

20. The improvement of claim 19 wherein said second valve portion is in engagement with another of said detent portions to close said second valve and said end of said shaft is out of engagement with said second valve to close said first valve in said hold mode.

21. The improvement of claim 15 wherein said force motor includes a cavity, said first and second valve modulating said pressure and vacuum sources.

22. The improvement of claim 21 wherein said force motor further includes a diaphragm having a cavity in fluid communication with either side of said diaphragm, the operation of said first and second valves controlling the pressure differential across said diaphragm.

23. The improvement of claim 22 further including a field and armature assembly, the armature being operatively connected with said first and second valves, said armature being provided with a signal of either a first polarity across said field, a second polarity across said field or zero current through said field for said three modes.

References Cited
UNITED STATES PATENTS

| | | | |
|---|---|---|---|
| 3,433,535 | 3/1969 | Horvath | 188—181 A X |
| 3,441,320 | 4/1969 | Flory | 188—181 A X |
| 3,467,444 | 9/1969 | Leiber | 303—21 B |

MILTON BUCHLER, Primary Examiner

J. J. McLAUGHLIN, Assistant Examiner

U.S. Cl. X.R.
188—181 A; 303—61